(12) United States Patent
Geldart et al.

(10) Patent No.: US 12,065,715 B2
(45) Date of Patent: Aug. 20, 2024

(54) POLYMETALLIC NODULE MINERAL PROCESSING

(71) Applicant: Loke Marine Minerals AS, Stavanger (NO)

(72) Inventors: Benjamin David Geldart, London (GB); David Dreisinger, Delta (CA); Niels Verbaan, Lakefield (CA); Marlon Canizares, Lakefield (CA)

(73) Assignee: LOKE MARINE MINERALS AS, Stavanger (NO)

( * ) Notice: Subject to any disclaimer, the term of this patent is extended or adjusted under 35 U.S.C. 154(b) by 48 days.

(21) Appl. No.: 17/817,727

(22) Filed: Aug. 5, 2022

(65) Prior Publication Data
US 2024/0043962 A1    Feb. 8, 2024

(51) Int. Cl.
| | | |
|---|---|---|
| C22B 47/00 | (2006.01) | |
| C22B 1/24 | (2006.01) | |
| C22B 3/00 | (2006.01) | |
| C22B 3/10 | (2006.01) | |
| C22B 3/22 | (2006.01) | |
| C22B 3/26 | (2006.01) | |

(52) U.S. Cl.
CPC ............ *C22B 47/0063* (2013.01); *C22B 1/24* (2013.01); *C22B 3/10* (2013.01); *C22B 3/22* (2013.01); *C22B 3/26* (2021.05); *C22B 23/0415* (2013.01); *C22B 23/0453* (2013.01)

(58) Field of Classification Search
CPC ......... C22B 47/0063; C22B 1/24; C22B 3/10; C22B 3/22; C22B 3/26; C22B 23/0415; C22B 23/0453; C22B 3/44; C22B 23/043; C22B 23/0461; C22B 47/00; Y02P 10/20

USPC ........................................................ 75/400
See application file for complete search history.

(56) References Cited

U.S. PATENT DOCUMENTS

| | | | | |
|---|---|---|---|---|
| 3,983,017 | A | | 9/1976 | Szabo |
| 4,026,773 | A | * | 5/1977 | Van Peteghem ..... C22B 15/0069 423/100 |
| 4,107,262 | A | * | 8/1978 | Lueders .................. C22B 3/00 423/150.5 |

FOREIGN PATENT DOCUMENTS

AU              749257 B2     6/2002

OTHER PUBLICATIONS

Jacobs, J. H., "The Effect of Cell Variables on the Electrowinning of Manganese," Trans. Electrochem. Soc. 1946, vol. 90, Issue 1, pp. 211-220.

Harris, M. et al.; "The Production of Electrolytic Manganese in South Africa," Journal of the South African Institute of Mining and Metallurgy, Feb. 1977, pp. 137-142.

(Continued)

*Primary Examiner* — Brian D Walck
*Assistant Examiner* — Danielle Carda
(74) *Attorney, Agent, or Firm* — Baker Botts L.L.P.

(57) ABSTRACT

The present disclosure is directed, in certain embodiments, to processes for recovering metals from polymetallic nodules. The processes may include one or both of (i) a weak acid wash of the polymetallic nodule material and (ii) nano-filtration and/or limestone neutralization of recycled manganese-rich stream to remove magnesium from process streams to improve the recovery of target metals, including manganese. The processes may include cobalt and/or nickel solvent extraction to improve metal(s) recovery.

8 Claims, 7 Drawing Sheets

(56) References Cited

OTHER PUBLICATIONS

Dames and Moore and EIC Corporation for U. S. Dept. of Commerce, National Oceanic and Atmospheric Administration, Office of Marine Minerals, Contract 6-35331; "Description of Manganese Nodule Processing Activities for Environmental Studies", vol. III. Processing Systems Technical Analyses, Aug. 1977, 570 pages.

Agarwal, et al.; "Kennecott Process for Recovery of Copper, Nickel, Cobalt and Molybdenum from Ocean Nodules," Society of Mining Engineers of Aime, for presentation at the 1978 AIME Annual Meeting, Feb. 28-Mar. 2, 1978, 7 pages.

Agarwal, et al.; "Kennecott Process for Recovery of Copper, Nickel, Cobalt and Molybdenum from Ocean Nodules," Society of Mining Engineers of Aime, Dec. 1979, 4 pages.

Haynes, et al.; "Pacific Manganese Nodules: Characterization and Processing," Bulletin U. S. Dept. of the Interior, Bureau of Mines, 679, 1985, 48 pages.

Haynes, et al; "Laboratory Processing and Characterization of Waste Materials From Manganese Nodules," U. S. Dept. of the Interior, Bureau of Mines, 8938, 1985, 21 pages.

Dobson, T., et al.; "Commissioning Under a Microscope—the Cawse Nickel Start-Up," The AusIMM Proceedings, vol. 306, No. 1, 2001, pp. 27-33.

Dreisinger, et al.; "The Recovery of Zn, Co and Mn from Baja Mining Corp's El Boleo Orebody," Https://www.researchgate.net/publication/267786772, TMS (The Minerals, Metals & Materials Society), 2010, pp. 623-636.

Pengru, et al.; "Study on Magnesium Removal by Fluoridation Precipitation of Manganese Sulfate Solution," Nonferrous Metals Soc. (smelting part) (http://ysyl.bgrimm.cn) Issue 12, Jun. 27, 2012, 5 pages.

Lin, et al.; "Separation of Manganese from Calcium and Magnesium in Sulfate Solutions Via Carbonate Precipitation," Trans Nonferrous Metals Soc. China, 2016, 8 pages.

Lin, et al.; "Preparation of Manganese Sulfate from Low-grade Manganese Carbonate Ores by Sulfuric Acid Leaching," https://www.researchgate.net/publication/302977869, International Journal of Minerals Metallurgy and Materials, vol. 23, No. 5, May 2016, p. 491-500.

Jiang, et al.; "Study on the Reductive Leaching of the Seabed Co—Mn Polymetallic Ore with CO and Ammonia," ALTA 2016 Nickel-Cobalt-Copper Proceedings, p. 35.

\* cited by examiner

POLYMETALLIC NODULE MINERAL PROCESSING

TECHNICAL FIELD

The present disclosure generally relates to mineral extraction and recovery, and more specifically to polymetallic nodule mineral processing.

BACKGROUND

Polymetallic seabed nodules are found in areas of the ocean floor. These nodules may include a number of metals of value for industrial applications, such as nickel, copper, cobalt, molybdenum, and manganese. For example, the Clarion-Clipperton zone of the Pacific Ocean is especially notable as a future supply of these nodules. There exists a need for improved processes for recovering metals from polymetallic nodules.

SUMMARY

The purpose and advantages of the disclosed subject matter will be set forth in and are apparent from the description that follows, as well as will be learned by practice of the disclosed subject matter. Additional advantages of the disclosed subject matter will be realized and attained by the devices particularly pointed out in the written description and claims hereof, as well as from the appended drawings.

To achieve these and other advantages and in accordance with the purpose of the disclosed subject matter, as embodied and broadly described, the disclosed subject matter includes a process for metal recovery. The process includes receiving one or more polymetallic nodules; contacting the one or more polymetallic nodules to an acidic solution, thereby extracting one or more magnesium-containing components from the one or more polymetallic nodules; after contacting the one or more polymetallic nodules to the acidic solution, separating a portion of the acidic solution that comprises (e.g., that is rich in or comprises greater than a threshold amount of) the extracted one or more magnesium-containing components from the one or more polymetallic nodules; and after separating the portion of the acidic solution from the one or more polymetallic nodules, providing the one or more polymetallic nodules to a process configured to recover nickel, cobalt, copper, and manganese (e.g., and optionally other valuable metals) from the one or more polymetallic nodules.

Additionally, in some embodiments, providing the one or more polymetallic nodules to the process to recover manganese comprises performing a reductive leaching process on the polymetallic nodules after separating the portion of the acidic solution from the one or more polymetallic nodules; obtaining a manganese-containing product from an output of the reductive leaching process; performing an acid extraction on the manganese-containing product, purifying the acid-extracted manganese-containing product; and extracting manganese from the purified manganese-containing product.

Furthermore, in some embodiments, the manganese-containing product is manganese carbonate. In some embodiments, the acidic solution comprises a weak acid configured to selectively remove the one or more magnesium-containing components from the one or more polymetallic nodules. In some embodiments, the acidic solution comprises hydrochloric acid. In some embodiments, a pH of the of the acidic solution is greater than or equal to 2.

Moreover, in some embodiments, the process further includes grinding the received one or more polymetallic nodules to prepare particles of the received one or more polymetallic nodules. Contacting the one or more polymetallic nodules to the acidic solution may comprise contacting the acidic solution to the one or more polymetallic nodules before the one or more polymetallic nodules are ground. Contacting the one or more polymetallic nodules to the acidic solution may comprise contacting the acidic solution to the one or more polymetallic nodules while the one or more polymetallic nodules are ground.

In accordance with another aspect of the disclosed subject matter, a process for metal recovery comprises receiving one or more polymetallic nodules; grinding the received one or more polymetallic nodules to prepare particles of the received one or more polymetallic nodules; providing the particles to a reductive leach process; performing the reductive leach process by contacting the particles to one or more reducing agents, thereby extracting one or more metal-containing components from the particles into a leachate; providing a solid portion obtained from the reductive leach process to a multi-step process configured to recover manganese from the leachate; providing a fluid portion of the leachate as a leachate recycle stream to a solvent extraction process; performing the solvent extraction process on the leachate recycle stream, thereby removing at least a fraction of metal-containing components from the leachate recycle stream; and providing the leachate recycle stream with at least the fraction of the metal-containing components removed back to the reductive leach process.

Moreover, in some embodiments, the reductive leach process comprises repeatedly contacting the leachate and the recycled leachate stream to the one or more reducing agents and providing the fluid portion of the leachate to a process for oxidizing copper and cobalt species in the fluid portion of the leachate.

Additionally, in some embodiments, performing the solvent extraction process comprises contacting the leachate recycle stream to a solvent and, after contacting the leachate recycle stream to the solvent, providing at least a portion of the solvent to a process to recover one or more of the metal-containing components. In some embodiments, the process to recover the one or more of the metal-containing components is an electrochemical recovery process. In some embodiments, the solvent extraction process is configured to extract species comprising $Co^{2+}$ and $Ni^{2+}$. In some embodiments, following the solvent extraction process, the leachate recycle stream comprises species comprising $Cu^+$.

In accordance with yet another aspect of the disclosed subject matter, a process for metal recovery comprises receiving a manganese-containing input; performing an acid leaching process on the received manganese-containing input; performing one or more manganese recovery processes on an output of the acid leaching process; performing a magnesium removal process on an output of the one or more manganese recovery processes; and providing a first (e.g., magnesium-poor) portion of an output of the magnesium removal process as a recycle stream to one or both of the manganese-containing input and the acid leaching process. The first portion of the output of the magnesium removal process comprises less magnesium than a second portion (e.g., a magnesium-rich portion) of the output of the magnesium removal process.

Additionally, in some embodiments, performing the magnesium removal process comprises contacting the output of the one or more manganese recovery processes with limestone, thereby generating a neutralized stream. In some embodiments, performing the magnesium removal process comprises filtering the output of the one or more manganese recovery processes to recover and recycle acid to the acid leaching process. In some embodiments, performing the one or more manganese recovery processes comprises electrochemically recovering one or both of manganese metal and manganese hydroxide.

Moreover, in some embodiments, the process includes extracting metal sulphides from the output of the acid leaching process. In some embodiments, the process includes providing the second portion (e.g., the magnesium-rich portion) of the output of the magnesium extraction process to waste.

Technical advantages of certain embodiments of this disclosure may include one or more of the following. For example, this disclosure facilitates the efficient extraction of metals, such as, nickel, copper, cobalt, molybdenum, and manganese from polymetallic nodules via a series of hydrometallurgical processes. In some embodiments, metal recovery is enhanced by improving the properties of recycled process streams. For example, in some embodiments, magnesium, cobalt, and/or nickel are removed from certain process streams to improve extraction in other processes. In some embodiments, the processes and technology of this disclosure reduce the buildup of cobalt and nickel in a leachate stream that is recirculated through a reductive leach process by incorporating additional cobalt and nickel solvent extraction processes. This facilitates the removal of excess cobalt and improves leach yields by controlling the ratio of metal to ammonia in the leach mixture. In some embodiments, the processes and technology of this disclosure improve magnesium removal via a multi-stage, adaptable approach to improve manganese extraction (e.g., via electrowinning). The technology may include one or both of (i) a weak acid wash of the polymetallic nodule material and (ii) nano-filtration and/or limestone neutralization of recycled manganese-rich stream to remove magnesium from process streams and thereby improve the recovery of target metals, including manganese.

BRIEF DESCRIPTION OF THE DRAWINGS

The subject matter of the application will be more readily understood from the following detailed description when read in conjunction with the accompanying drawings, in which.

DETAILED DESCRIPTION

Figure 1:
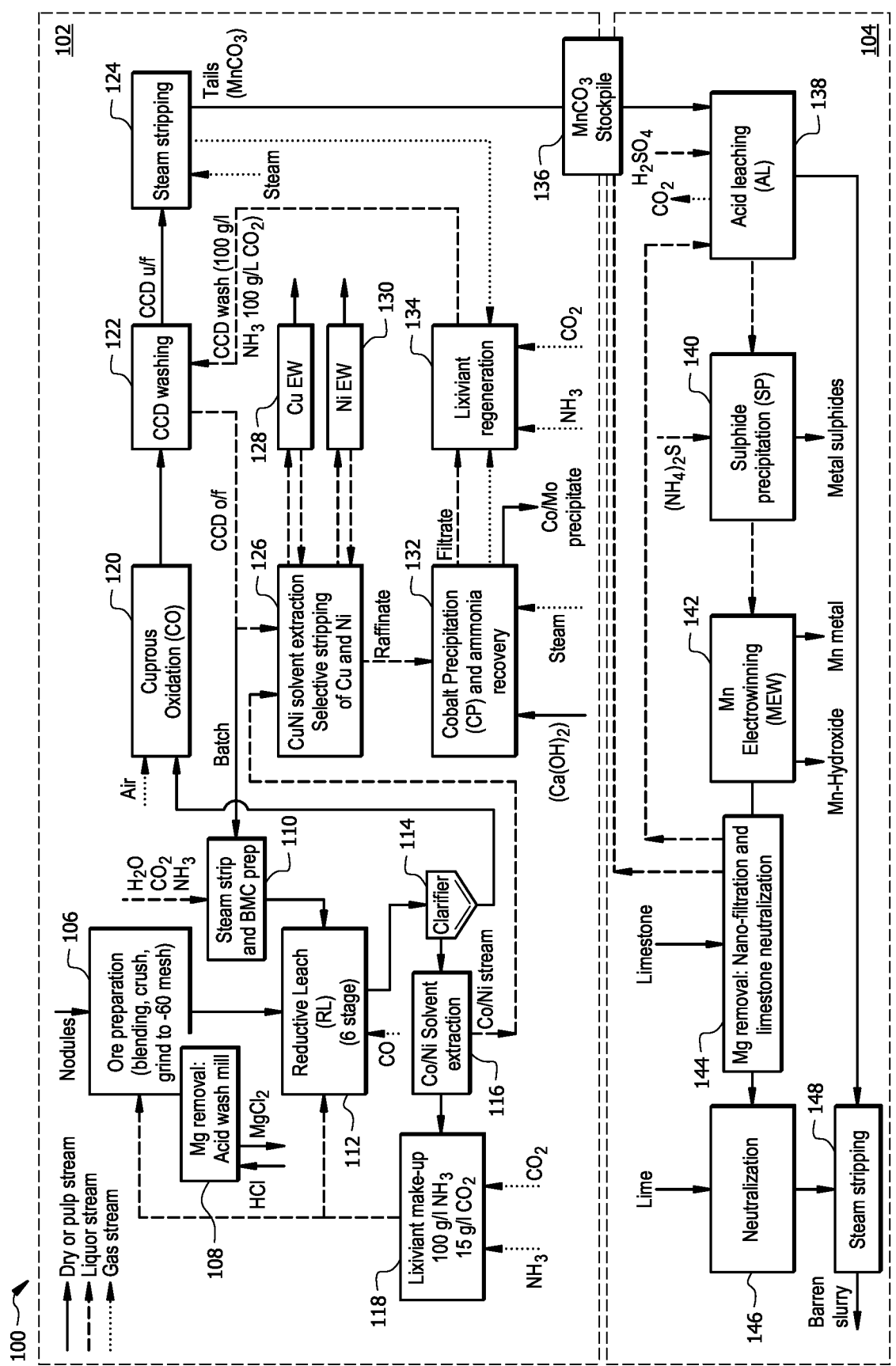
FIG. 1 is a flow diagram illustrating an example process for metal recovery from polymetallic nodules, in accordance with certain embodiments of this disclosure.

A previous process for recovering metals from polymetallic nodules is described in U.S. Pat. No. 4,107,262. This disclosure recognizes that this previous process suffers from various drawbacks and disadvantages and provides corresponding solutions. The previous process uses a reductive leaching process in a copper-containing ammonia-ammonium carbonate solution to extract nickel, cobalt, and copper as ammine complexes into a leachate and produces a manganese carbonate-containing residue. The manganese carbonate-containing residue may then be treated by an acid leaching, purification, electrowinning process to recover electrolytic manganese metal (EMM).

While this previous process provides a possible process route to recovery of some metals, this disclosure recognizes that it suffers from a number of disadvantages. For example, this disclosure recognizes that the performance of an initial reductive leach process employed in the previous recovery process decreases in performance over time. Instead of providing reliable metal recovery, as the metal content of the leach solution increases, the availability of the ammonia species is reduced, resulting in decreased metal recovery over time. The effectiveness of cobalt extraction particularly decreases due to this issue.

Accordingly, in certain embodiments, this disclosure provides an alternative and improved method to recover cobalt from a recycled solution that is received from the reductive leaching process and provided back to this process and/or to an initial ore preparation process in which polymetallic nodules are crushed and/or milled. This new approach improves the overall performance of the reductive leaching process in a number of ways. For example, this approach adjusts the relative amounts of cobalt and ammonia in the leach solution to values that improve overall recovery and make the leach process more reliable over time. For instance, solvent extraction of the leachate may be performed to recover nickel (e.g., in the form of $Ni^{2+}$) and cobalt (e.g., in the form of $Co^{2+}$) together with any $Cu^{2+}$ present in the leachate. Cuprous ion ($Cu^+$) remains in solution and is not extracted, thereby allowing the $Cu^+$ to be recycled through the process circuit to aid in the reductive leaching process. In some embodiments, this leachate recycle circuit is configured to facilitate the production of battery salts (e.g., nickel and cobalt sulphate salts), such that downstream electrowinning processes can be removed or reduced in scale if desired. Further details of cobalt and nickel extraction are described below with respect to the examples of FIGS. 1, 3, and 6.

This disclosure also recognizes that when previous processes are used magnesium tends to accumulate in the leach solution both at the initial reductive leaching process and in a subsequent acid leaching process used for manganese recovery. The presence of increased concentrations of magnesium can result in decreased overall recovery of metals of interest, such as manganese, cobalt, nickel, and copper. Some of the magnesium-containing solution could be purged in an effort to decrease magnesium concentration. However, this results in loss of the metals targeted for recovery and of the reactants that have to be added to facilitate the overall process. Accordingly, a purge of the magnesium-containing solution can result in decreased recovery and increased reactant consumption and waste.

Magnesium cannot be readily removed/recovered through electrochemical processes, and previous processes for magnesium removal involve caustic reactants, are costly, and are complex.

This disclosure overcomes these problems of previous technology by incorporating one or both of (i) a weak acid wash at or near the ore preparation process to facilitate an initial removal of magnesium from polymetallic nodules and (ii) nano-filtration and/or limestone neutralization following the electrochemical manganese recovery processes to remove residual magnesium from the acid leach solution that is recycled for magnesium recovery. These processes facilitate the removal of magnesium to improve the initial reductive leaching processes and subsequent acid leaching processes for overall improvements to the amount and type of metals that can be recovered from the polymetallic nodules. Further details of magnesium removal are described below with respect to the examples of FIGS. 1, 2A-C, and 4-7.

Example Metal Recovery Process

FIG. 1 illustrates an example process 100 of metal recovery from polymetallic nodules. Polymetallic nodules typically include oxides of various metals, such as nickel, copper, cobalt, molybdenum, and manganese. For example, polymetallic nodules may include amorphous precipitates of metals, including manganese dioxide and/or other metal oxides. Process 100 facilitates the improved recovery of these metals for use in other applications. Process 100 includes an initial process 102 in which cobalt, molybdenum, nickel, and copper are recovered and a manganese-containing product is obtained as manganese stockpile 136 (e.g., comprising manganese carbonate, $MnCO_3$). The manganese stockpile 136 is provided as an input to a secondary process 104 in which manganese metal and/or manganese hydroxide are recovered. Further details of operations in process 100 are provided in the subsections below.

Ore Preparation

Process 100 may begin with ore preparation 106. At ore preparation 106, polymetallic nodules are processed into particulates. For example, the polymetallic nodules may be blended, crushed, and/or ground into particulates of a desired size. For example, the particulates may be about 50 micrometers in diameter. Ore preparation 106 may include any other operations for preparing polymetallic nodules for further processing in process 100.

Magnesium Removal with Acid Wash

In previous processes, magnesium that is leached from the polymetallic nodules is not effectively removed and thus tends to accumulate in the recycle stream (see flow from operation 112 back to ore preparation 106 of FIG. 1). The only previous option for magnesium removal from this recirculating stream was to purge a portion of the solution. This process is often referred to as "bleeding" the circuit to prevent accumulation of an impurity. The solution that is being purged or bled from the circuit will contain dissolved magnesium sulfate salt but will also contain desirable products and valuable reactants, such as, for example, manganese sulfate, sulfuric acid, ammonium sulfate, and water. The purging or bleeding of solution therefore produces an effluent that contains significant valuable materials, such as manganese and chemical reagents. Processes to recover valuable products in the presence of magnesium can also be costly and complex. Therefore, it is undesirable for magnesium to be present in the solution sent to the reductive leach 112 operation (described further below). It is also undesirable to have magnesium in the solid residue from the reductive leach (e.g., the $MnCO_3$ containing residue).

This disclosure not only recognizes these problems of previous technology but also provides solutions to these problems. For example, before, during, or after ore preparation 106, magnesium removal 108 can be performed to decrease the concentration of magnesium in the polymetallic nodules. Preliminary results have demonstrated that washing with a weak acid, such as hydrochloric acid (HCl) unexpectedly improves the extraction of magnesium from polymetallic nodules and significantly reduces the amount of material that is lost through a waste or bleed stream (see Experimental Examples below). A weak acid is added to carefully control leaching conditions, such that magnesium is removed with little or no loss of other metals. The resulting reduction in magnesium content provides improvements to both the initial process 102 used to recover metals, such as cobalt, molybdenum, copper, and nickel, and the subsequent process 104 for manganese recovery.

During magnesium removal 108, the polymetallic nodules are treated with an acid (e.g., HCl) solution to extract a portion of the magnesium from the nodules prior to entry into the subsequent processes. This can be performed on the as-received nodules, on the milled nodules (e.g., after ore preparation 106) and/or as part of ore preparation 106. The pH of the acid solution may be adjusted to limit or prevent the co-extraction of other metals present in the polymetallic nodules. The pH of the acid solution used for magnesium removal 108 may be 2 or greater. After magnesium removal 108, the resulting acid-leached nodules (or particulates), may be washed and provided as a relatively magnesium-poor feed material to operation 106 and/or operation 112. The magnesium-rich acid may be discarded and/or used as a feed material for magnesium recovery. For example, the magnesium-rich acid solution may be treated with limestone or lime to increase the pH and precipitate any metals in solution for subsequent recovery. As used herein, the term "magnesium-poor" may refer to a material having a decreased magnesium content relative to a previous condition of the material. For example, polymetallic nodules are "magnesium-poor" following magnesium removal 108. As used herein, the term "magnesium-rich" may refer to a material having an increased magnesium content relative to a previous condition of the material. For example, the acid used in magnesium removal 108 is "magnesium-rich" following its use for removal of magnesium from the polymetallic nodules.

Figure 2A:
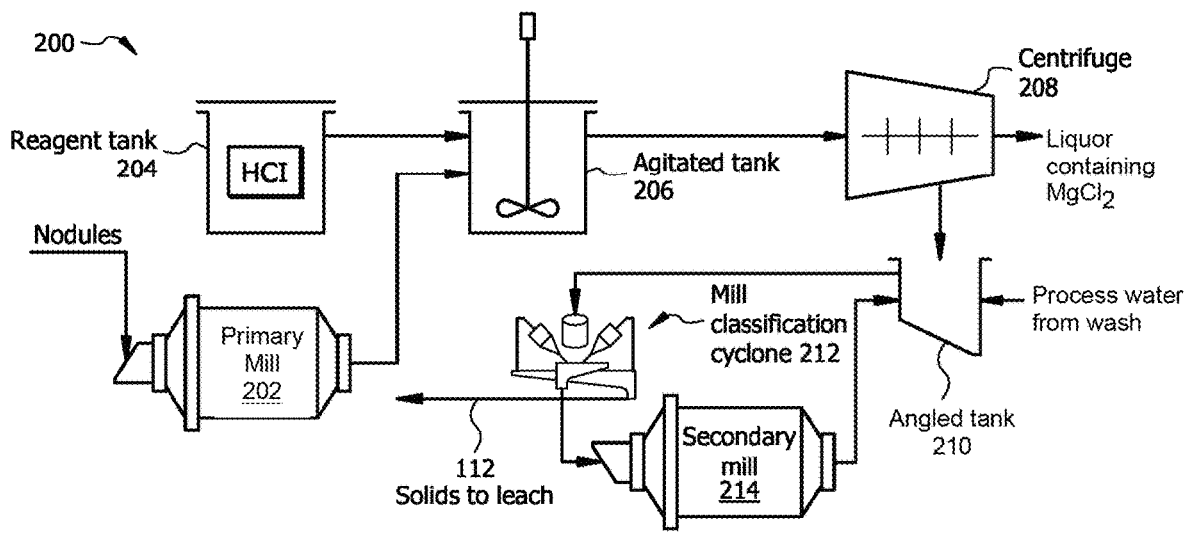
FIGS. 2A, 2B, and 2C are diagrams illustrating example systems for magnesium removal from polymetallic nodules before, during, or after ore preparation, in accordance with certain embodiments of this disclosure.
Figure 2B:
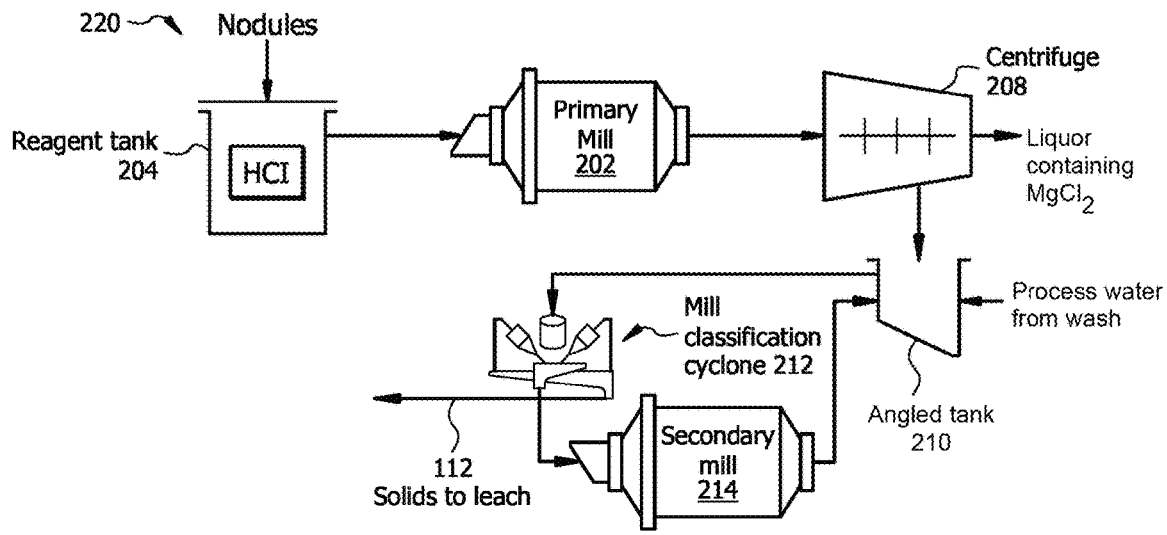
Figure 2C:
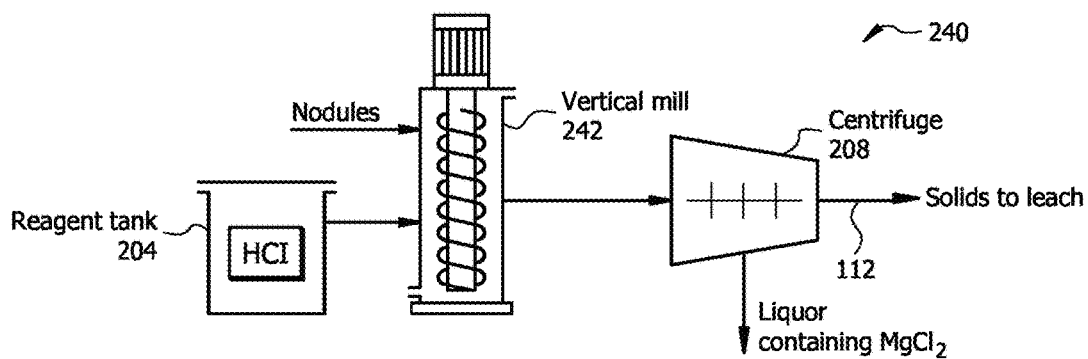

FIGS. 2A, 2B, and 2C illustrate example systems 200, 220, 240 for magnesium removal from polymetallic nodules before, during, or after ore preparation 106. FIGS. 2A, 2B, and 2C are provided for illustration. This disclosure contemplates any appropriate system being used to perform magnesium removal 108, as described above. Irrespective of the system used to perform magnesium removal 108, the process involves the contact of an acidic solution at a controlled pH (e.g., at a pH of 2 or greater) to selectively extract magnesium from the nodules before subsequent steps of process 100 are performed.

In the first example system 200 of FIG. 2A, polymetallic nodules are ground/blended in a first preparation device 202 (e.g., a device capable of crushing, grinding, and/or blending polymetallic nodules) before being exposed to acid solution. The resulting particulates are then mixed with acid 204 in a tank 206. A separation device 208 (e.g., a sedimentation device, filtration device, a centrifugal separation device, or the like) separates the acid-washed particulates from the magnesium-rich acid solution (referred to as "liquor" in FIG. 2A). The magnesium-rich acid solution is neutralized and discarded or provided for magnesium recovery. The acid-washed particulates are rinsed in any appropriate container 210. The rinsed particulates are provided to a preparation device 212, which may be a mill classification cyclone. The mill classification device crushes and grinds the particulates from container 210. A portion of the prepared and rinsed particulates may be provided to a second preparation device 214 (or in a loop back to preparation device 212) to further grind, crush, and/or blend the rinsed particulates provided to a final preparation device 212, for example, if a target particle size has not been reached. Overall devices 212 and 214 perform any further crushing, grinding, blending, and/or filtering to achieve particulates with desired properties (e.g., a desired size) for further processing in the reductive leach 112 (see FIG. 1).

FIG. 2B illustrates another example system 220 for performing magnesium removal 108. In system 220, the polymetallic nodules are rinsed in acid solution 204 before being ground in the first preparation device 202. The resulting magnesium-poor nodules are then crushed/ground and processed similarly to as described above with respect to FIG. 2A. FIG. 2C illustrates yet another example system 240 for performing magnesium removal 108. In system 240, the polymetallic nodules and acid solution are provided to a vertical preparation device 242. The vertical preparation device 242 allows the acid solution to contact the nodules while the nodules are crushed/ground into the particulate form used in subsequent steps of process 100. The resulting magnesium-poor particulates are then separated from the magnesium-rich acid (or "liquor) and either processed as shown in FIGS. 2A and/or 2B (not shown in FIG. 2C) or provided directly to the reductive leach 112 process (see FIG. 1).

Reductive Leaching

Returning to FIG. 1, the relatively magnesium-poor particulates of the polymetallic nodules that are obtained from magnesium removal 108, are provided for reductive leach 112. The reductive leach 112 process involves the contacting of the particulates to reductive stream 110, which includes reducing agents and may be prepared, for example, through the combination of steam (high-temperature $H_2O$), $CO_2$ and $NH_3$. Example chemical reactions occurring in the reductive leach are provided below and generally result in the transformation of metal oxides into reduced metal-containing species that can be more readily recovered through subsequent operations of process 100:

Manganese: $MnO_2 + CO \rightarrow MnCO_3$

Nickel: $NiO + (NH_4)_2CO_3 + 4NH_3 \rightarrow Ni(NH_3)_6CO_3 + H_2O$

Cobalt: $CoO + (NH_4)_2CO_3 + 2NH_3 \rightarrow Co(NH_3)_4CO_3 + H_2O$

Zinc: $ZnO + (NH_4)_2CO_3 + 2NH_3 \rightarrow Zn(NH_3)_4CO_3 + H_2O$

Copper: $2CuO + CO + 4NH_3 \rightarrow Cu_2(NH_3)_4CO_3$

Molybdenum: $MoO_3 + 2NH_3 + H_2O \rightarrow (NH_4)_2MoO_4$

Figure 3:
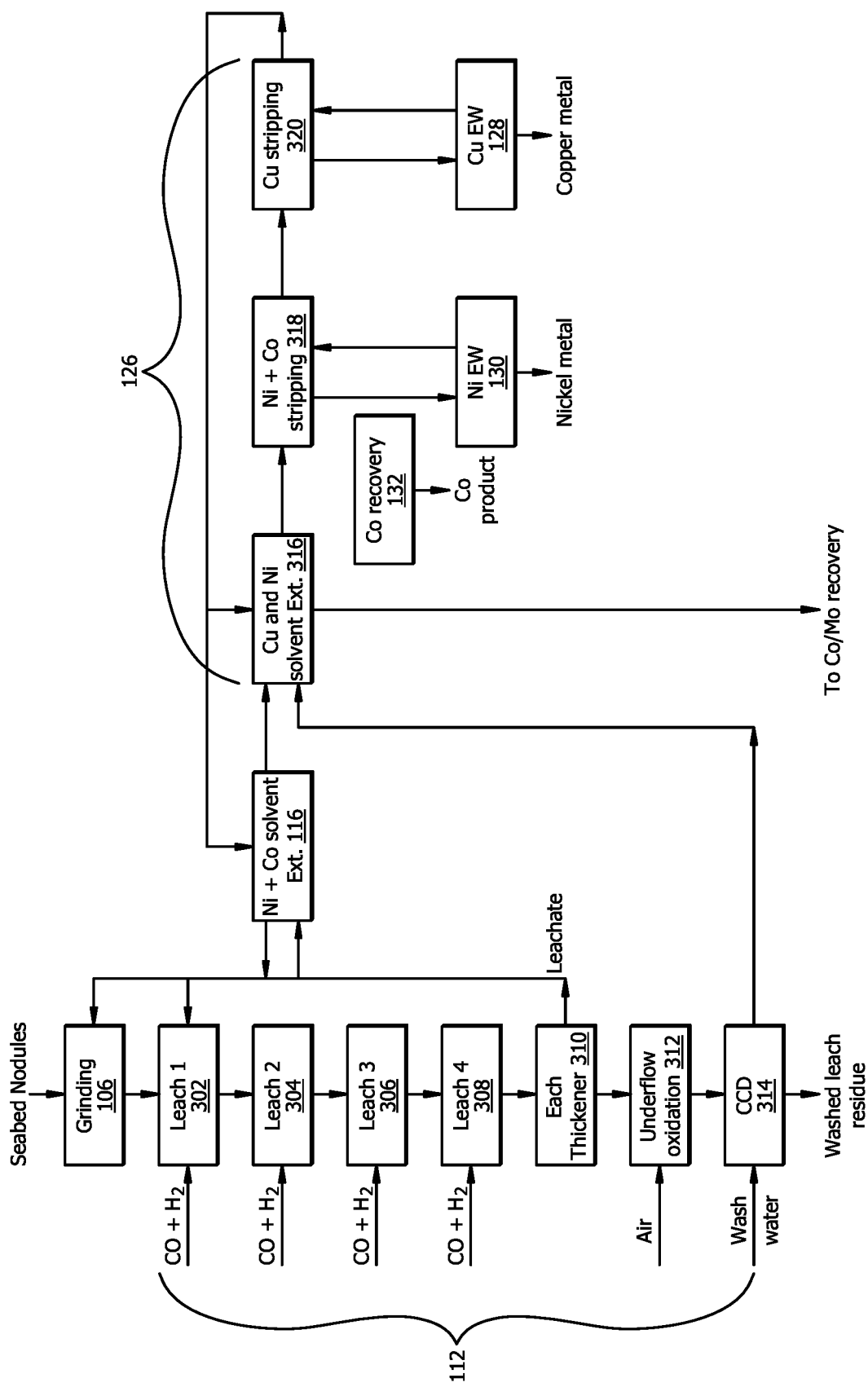
FIG. 3 is a diagram illustrating an example process for cobalt and nickel solvent extraction, in accordance with certain embodiments of this disclosure.

These reactions are provided for example only and may not reflect the diversity of reactions occurring in the reductive leach 112. FIG. 3, which is described in greater detail below, provides further details of an example multi-step reductive leach 112 process.

Following the reductive leach 112 process, the resulting product (solids and liquid) are provided to a clarifier 114. The clarifier 114 separates the product into solids and liquids. The liquids from the top of the clarifier 114 (e.g., the thickener overflow of FIG. 3, described below) are provided in a leachate recycle stream that eventually returns to the reductive leach 112, as shown in FIG. 1. Solids and remaining liquids are provided to processes for metal recovery (see Copper, Nickel, Molybdenum, and Cobalt Recovery subsection below).

The recycled leachate stream first undergoes a new cobalt/nickel(Co/Ni) solvent extraction 116 before a lixiviant makeup 118 may be provided to add $NH_3$ and $CO_2$ back into the recycle stream to adjust the streams composition for improved results in the reductive leach 112.

Cobalt and Nickel Extraction from Recycled Leach Solution

This disclosure recognizes that the ability to extract metals is linked to or at least partially limited by the ability to complex the metals by ammonia (see the example reactions of the reductive leach 112 provided above). Metal extraction performance has been observed to decrease as the concentration of cobalt and nickel increases relative to ammonia species. To overcome these problems, a Co/Ni solvent extraction 116 is performed to remove cobalt and nickel from the recycled leachate stream, resulting in improved reduction of metal oxides in the reductive leach 112 and improved overall metal extraction.

During Co/Ni solvent extraction 116, a reduced solution containing low to negligible amounts of $Cu^{2+}$ is contacted with a solvent (e.g., hydroxyoxime solvent extractant, such as LIX84 from BASF corporation) to recover $Ni^{2+}$ and $Co^{2+}$ together with any $Cu^{2+}$ present. Cuprous ion ($Cu^+$) generally remains in solution and is not extracted by the solvent, thereby allowing $Cu^+$ to be recycled to the reductive leach 112 process. This maintains the efficiency of the reductive leach 112 process over time.

Solvent extraction 116 may be performed under anoxic conditions to prevent oxidation of $Cu^+$ to $Cu^{2+}$. For example, solvent extraction 116 under anoxic conditions may be performed in a pulsed column type of contactor. In an example column, the organic solution that includes the solvent is introduced at the bottom of the column, and the aqueous solution comprising the metal cations is introduced at the top of the column. The light organic solution rises, and the heavy aqueous solution falls. Pulsation is provided, and mixing is provided by the structure of the column to cause shearing of the two liquids during pulsation, providing dispersion.

After solvent extraction 116, the extracted metal ions may be stripped (e.g., the reverse of extraction) by contact with a weakly acidic solution. For example, Nickel may be stripped from the solvent using an acidic solution (e.g., the spent solution) from the nickel electrowinning 130 process (described below). Copper may be stripped in a subsequent process using an acidic solution (e.g., spent solution) from copper electrowinning 128 (described below). In certain embodiments, nickel and cobalt can be stripped simultaneously by contact of the loaded solvent with nickel electrowinning spent solution. The cobalt-containing, nickel strip solution can then be treated for cobalt removal. In some embodiments, cobalt separation from nickel after stripping may be performed by solvent extraction or chemical precipitation in a separate circuit. In some embodiments, the process 100 is configured to produce battery salts (e.g., nickel and cobalt sulphate salts). In such cases, one or more of the electrowinning processes may optionally be omitted or operated at a reduced capacity.

FIG. 3 illustrates the Co/Ni solvent extraction 116 in the context of other related operations of process 100 in greater detail. As shown in FIG. 3, particulates from ground polymetallic nodules are provided to the reductive leach 112 process. FIG. 3 shows an example reductive leach 112 process with multiple leach steps 302, 304, 306, 308. The output of these leach steps 302, 304, 306, 308 is provided to a thickener 310, which may correspond to the clarifier 114 of FIG. 1 (or a portion of the clarifier 114). Fluid overflow from the thickener 310 is provided as the leachate recycle stream that is sent to Co/Ni extraction 116.

The leachate solution overflowing from the leach thickener 310 and provided to the Ni/Co solvent extraction 116 may include $Cu^{2+}$, $Cu^+$, $Ni^{2+}$, $Co^{2+}$ and $Zn^{2+}$. These metal cations are generally complexed by ammonia, and the background solution will consist of ammonia-ammonium carbonate in water (e.g., in seawater from which the nodules were obtained or water with at least some salt). The proportion of $Cu^{2+}/Cu^+$ is determined by how reducing the solution is before discharge from the final leach step 308. This proportion may be adjusted or controlled, for example, by measuring the oxygen reduction potential (ORP) of the solution and adjusting the amount of reactants supplied at leach steps 302-308 to achieve a target oxygen reduction potential.

The underflow from the thickener 310 (e.g., solids and remaining liquids) is provided to an agitated tank where air is mixed into the slurry to perform oxidation 312 of copper and cobalt species. Example reactions that may be undergone during oxidation 312 are:

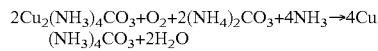

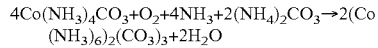

The resulting oxidized slurry is then provided to a series of thickeners to perform a CCD 314, which may include washing of the metal-rich solution away from the manganese carbonate containing solids. The metal-rich solution is first provided to a Cu and Ni solvent extraction 316 to recover nickel and copper (e.g., using a hydroxyoxime solvent extractant, such as LIX84 from BASF corporation). The cobalt and the molybdenum remain in the solution, which is provided for Co and Mo recovery (see operation 132 of FIG. 1). The solvent extraction solvent solution is provided to Ni and Co stripping 318. The stripped Co is recovered via Co recovery 132 (see FIG. 1 and description below) and Ni electrowinning (EW) 130 (see FIG. 1 and description below). The Ni and Co-poor portion from Ni and Co stripping 318 is provided to Cu stripping 320 and Cu electrowinning 128. The solution that is metal-poor may be recycled back to the Ni/Co solvent extraction 116.

Copper, Nickel, Molybdenum, and Cobalt Recovery

Returning to FIG. 1, a series of operations may be performed to recover metals of interest and generate a manganese-containing stockpile 136 for further processing to recover manganese. These operations are examples only, and any appropriate combination of operations may be used to recover any metal(s) of interest and recover the manganese-containing stockpile 136. In the example of FIG. 1, cuprous ion oxidation 120 is performed to oxidize the underflow from the clarifier 114. A countercurrent decantation (CCD) washing 122 is then performed with the underflow provided to steam stripping 124 to obtain the manganese-containing (e.g., the $MnCO_3$-containing) stockpile 136 and the overflow (CCD o/f in FIG. 1) provided to Cu/Ni solvent extraction 126. Cu and Ni are selectively stripped and provided to electrochemical recovery processes, including Cu electrowinning 128 for the recovery of Cu metal and Ni electrowinning 130 for the recovery of Ni metal. The raffinate from the Cu/Ni extraction 126 is provided to Co/Mo precipitation and ammonia recovery 132, which facilitates the precipitation of Co and Mo in the presence of quicklime (or calcium oxide, CaO) and/or lime (or calcium hydroxide, $Ca(OH)_2$), and steam stripping to recover ammonia and carbon dioxide species for lixiviant regeneration 134. The cobalt and molybdenum precipitates may undergo further refining (not shown).

Manganese Recovery

Still referring to FIG. 1, subsequent process 104 is performed to recover manganese from the manganese-containing stockpile 136. This process 104 involves a combination of acid leaching 138, purification via sulphide precipitation 140, and Mn electrowinning 142 (e.g., electrochemical recovery) to obtain manganese metal.

In acid leaching 138, material from the manganese-containing stockpile 136 (e.g., $MnCO_3$) is contacted with acid (e.g., a $H_2SO_4$ solution). The reaction may be:

At sulphide precipitation 140, the output from acid leaching 138 is contacted with a sulfur-containing material, such as ammonium sulphide ($(NH_4)_2S$). Depending on the metals remaining in the solution, various reactions may occur resulting in the precipitation of metal sulphides. For example, in the presence of Cu, Ni, and Co, the following reactions may occur at sulphide precipitation:

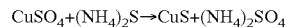

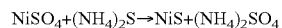

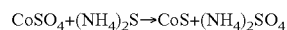

Manganese electrochemical recovery or electrowinning (EW) 142 is performed to recover Mn metal from the output of sulphide precipitation 140 (with the metal-sulphides removed). Electrowinning 142 may result in the recovery of Manganese hydroxide and/or manganese metal. Manganese metal may be obtained via the following reaction:

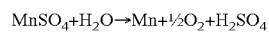

The spent solution from Mn electrowinning 142 is generally recycled back to the acid leaching 138 in order to collect any manganese remaining in the solution. However, this disclosure recognizes that if magnesium is present in the solution, this magnesium may accumulate via this recycle stream and result in decreased performance of Mn recovery. To overcome this problem, a magnesium removal 144 is performed on the solution that is recycled from Mn electrowinning 142 back to acid leaching 138. Manganese removal 144 is generally achieved using filtration and/or neutralization and improves the quality of the solution that is recycled to acid leaching 138, resulting in improved Mn recovery.

Figure 4:
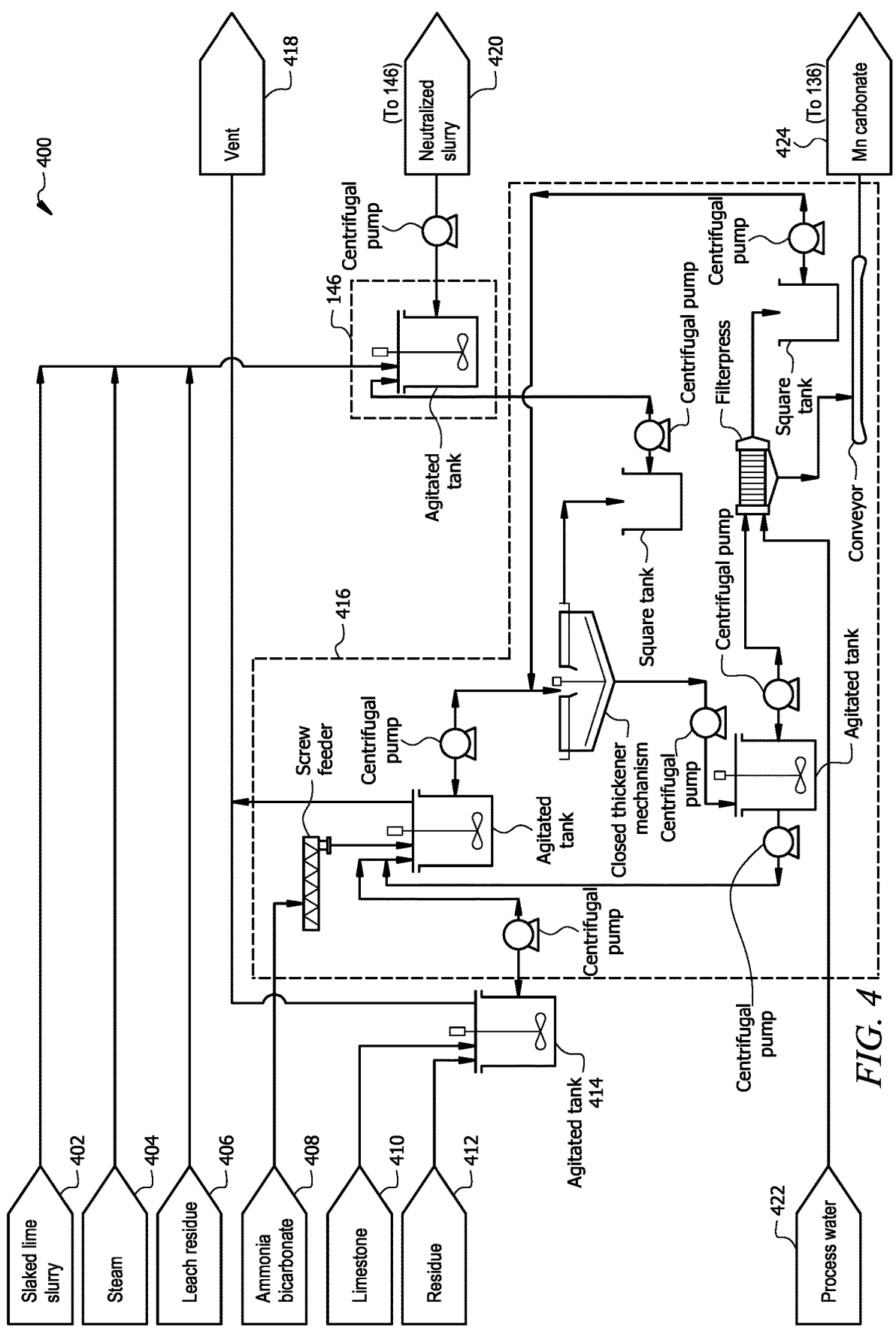
FIG. 4 is a diagram illustrating an example process flow for magnesium removal from a manganese-containing recycle stream, in accordance with certain embodiments of this disclosure.
Figure 5:
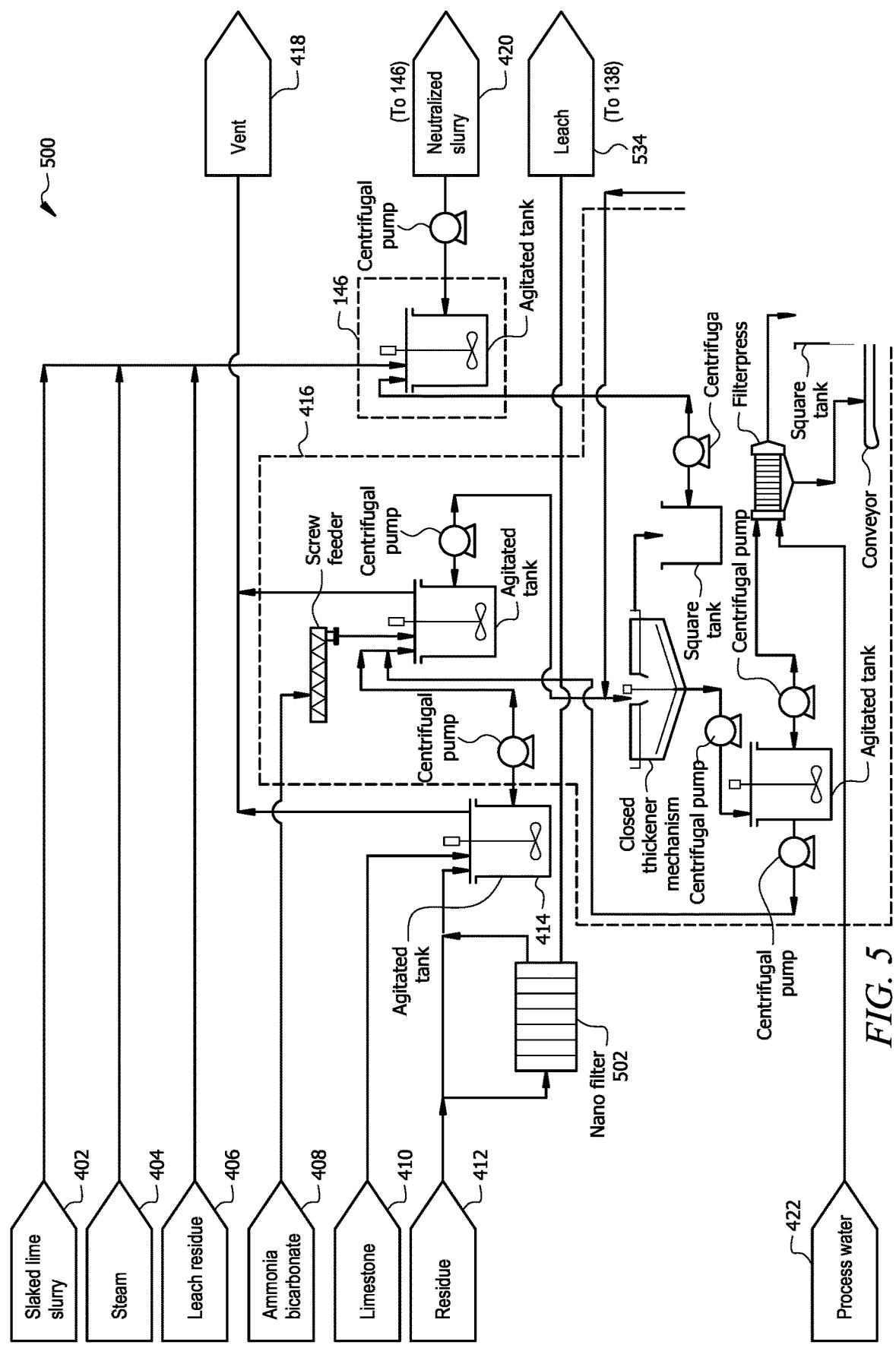
FIG. 5 is a diagram illustrating another example process flow for magnesium removal from a manganese-containing recycle stream, in accordance with certain embodiments of this disclosure.

FIGS. 4 and 5 illustrate two example configurations 400 and 500 for performing magnesium removal 144. In the first configuration 400 of FIG. 4, inputs to the process include a slaked lime slurry 402, steam 404, leach residue 406, ammonium bicarbonate 408, limestone 410, and recycle stream 412 (e.g., the stream recycled from Mn electrowinning 142 back to acid leaching 138). The limestone 410 and recycle stream 412 are provided to a tank 414 and mixed. The limestone 410 neutralizes the spent electrolyte from Mn electrowinning 142. This approach avoids the use of ammonia for primary neutralization and lime to react with ammonium sulfate, thereby reducing cost and complexity of the process. In tank 414, the neutralization of acid may proceed according to:

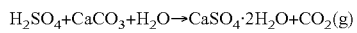

$$H_2SO_4 + CaCO_3 + H_2O \rightarrow CaSO_4 \cdot 2H_2O + CO_2(g)$$

The gypsum product ($CaSO_4 \cdot 2H_2O$) from neutralization is provided to process 416 where it is contacted with ammonium bicarbonate 408. $CO_2$ gas is released through vent 418. The gypsum product is washed using water 422 and ammonia bicarbonate 408 in process 416 to recover soluble manganese and ammonium sulfate, which may be recovered or used in other processes. Manganese carbonate 424 is obtained and provided back to the manganese-containing stockpile 136 and/or acid leaching 138 (see FIG. 1). Magnesium-containing products are directed to the neutralization process 146 and output in the neutralized slurry 420, such that magnesium does not accumulate during acid leaching 138.

If this approach is not used, a significant quantity of ammonia is needed to neutralize the solution obtained from Mn electrowinning 142. For example, every molecule of $H_2SO_4$ in the solution consumes two molecules of $NH_3$ (to form $(NH_4)_2SO_4$) and one molecule of $Ca(OH)_2$ (to form $CaSO_4 \cdot 2H_2O$). In contrast, when using the new magnesium removal process 144 of this disclosure, every $H_2SO_4$ consumes one $CaCO_3$ to form $CaSO_4 \cdot 2H_2O$, and the expense and complexity of working with ammonia is avoided.

FIG. 5 illustrates another configuration 500 for magnesium removal 144 in which an initial nanofiltration process is performed with nanofilter 502. The nanofilter 502 may be a membrane filter with nanometer-sized pores. The use of a nanofiltration process has surprisingly been found to recover acid 534 that can be recycled to acid leaching 138, while magnesium-containing components (e.g., magnesium sulfates) are directed to the neutralization process 416 to prevent magnesium accumulation. The use of nanofiltration decreases the amount of acid neutralization that is needed in tank 414 and improves the efficiency of acid leaching 138 (see FIG. 1) by providing a source of recycled acid 534.

Neutralization and Waste Release

Returning to FIG. 1, the magnesium-rich slurry of the magnesium removal process 144 is neutralized, for example, using lime. The resulting slurry (e.g., slurry 420 of FIGS. 4 and 5) is provided to a process of steam stripping 148 to obtain a barren slurry that can be discarded as waste or used as desired.

Example Method of Metal Recovery from Polymetallic Nodules

Figure 6:
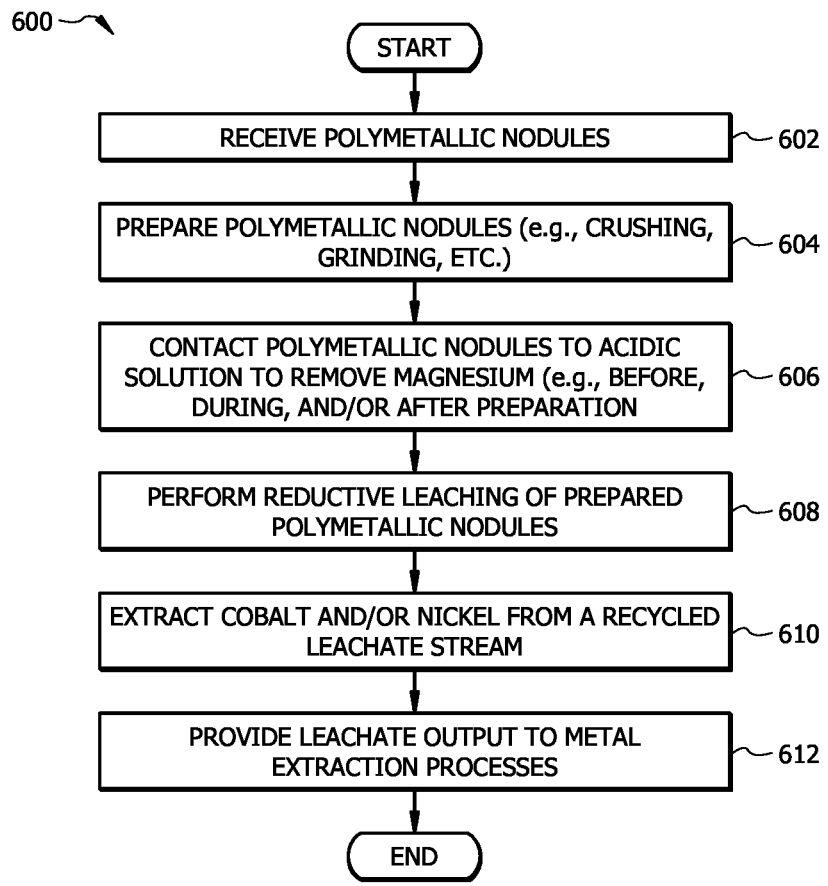
FIGS. 6 and 7 are flowcharts illustrating example portions of processes of metal recovery from polymetallic nodules, in accordance with certain embodiments of this disclosure.
Figure 7:
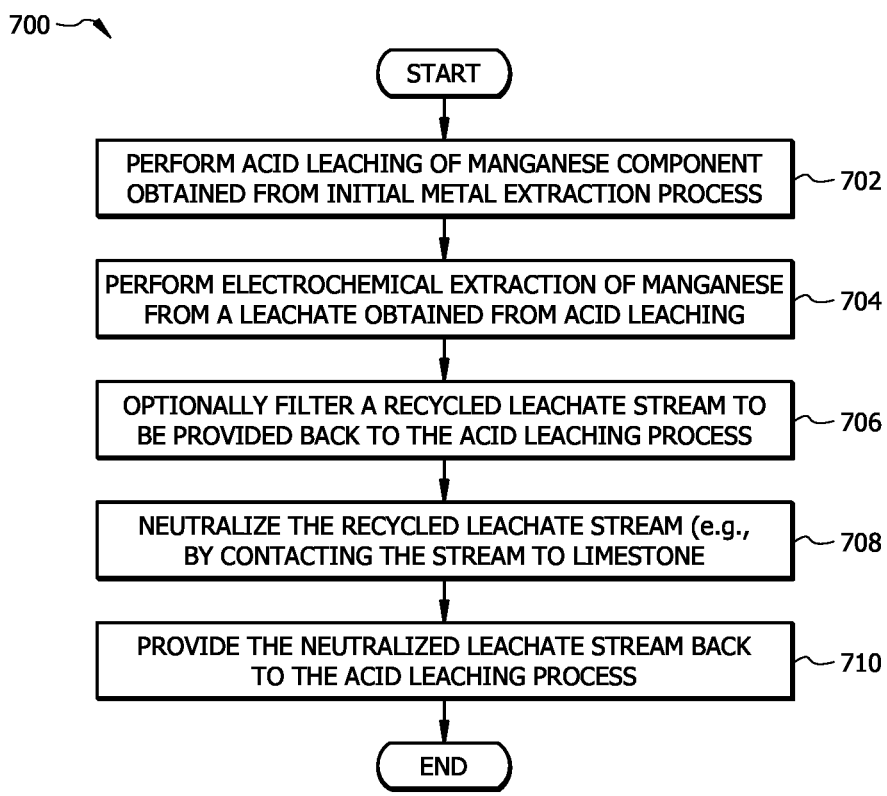

FIGS. 6 and 7 illustrate example processes 600 and 700 for recovering metals from polymetallic nodules. Process 600 generally corresponds to operations of initial process 102 of FIG. 1, while process 700 corresponds to operations of subsequent process 104 of FIG. 1. Process 600 may begin at step 602 where polymetallic nodules are received. At step 604, the polymetallic nodules are prepared. The polymetallic nodules may be prepared by crushing, grinding, blending, and/or filtering the polymetallic nodules. Step 604 may correspond to the operation of ore preparation 106 of FIG. 1.

At step 606, the polymetallic nodules are contacted to an acidic solution, as described with respect to the operation of magnesium removal 108 of FIG. 1. The acidic solution may be a weak acid that selectively removes one or more magnesium-containing components from the one or more polymetallic nodules, for example, by converting magnesium oxide to a soluble form of magnesium, such as magnesium chloride. The acidic solution may have a pH of 2 or greater.

At step 608, the reductive leaching process is performed as described with respect to reductive leach 112 of FIGS. 1 and 3 above. The reductive leaching process converts metal oxides in the polymetallic nodules to chemically reduced species that are more amenable to metal recovery, as described in greater detail above with respect to FIGS. 1 and 3. At step 610, cobalt and nickel are removed from a leachate recycle stream that is provided back to the input of the reductive leaching process of step 608. The operation of Co/Ni solvent extraction 116 of FIG. 1 may be performed at step 612. At step 612, the leachate output that is not recycled is provided to subsequent process for metal recovery. Example operations for metal recovery, such as for the extraction of cobalt, nickel, copper, and molybdenum are described above with respect to FIG. 1. A manganese-containing product is also generated at step 614 (see the manganese-containing stockpile 136 of FIG. 1).

FIG. 7 illustrates an example process 700 for obtaining manganese metal and/or manganese hydroxide using the manganese-containing stockpile 136 obtained from process 600 of FIG. 6. Process 700 may begin at step 702 where an acid leaching process is performed to obtain manganese ions in an acidic solution using material from the manganese-containing stockpile 136 (see acid leaching 138 of FIG. 1). At step 704, the electrochemical extraction of manganese is performed (see Mn electrowinning 142 of FIG. 1). At step 706, the solution remaining from step 704, which includes residual manganese may be filtered to extract acid from the solution. The acid may be provided back to the acid leaching process from step 702. The configuration of FIG. 5 may be used to perform step 706. At step 708, the remaining solution from step 706 is neutralized to remove magnesium. The magnesium-poor product is then provided back to the manganese-containing stockpile 136 and/or the acid leaching operation 138 at step 710.

In sum, the systems and processes described herein may facilitate improved processes for metal recovery from polymetallic nodules. As a result, processes for metal recovery from polymetallic nodules can be performed more effectively and reliably and for longer periods of time (e.g., without undesirable accumulation of unwanted products or products that constrain process performance, such as magnesium). Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context. The term "approximate" or "near" refers to being within about 30%, 20%, 10%, 5%, or less of a given value or another measurable characteristic.

EXPERIMENTAL EXAMPLES

Example 1. HCl Extraction of Mg from Polymetallic Nodules at Various pH Values

A sample of 300 g of seabed nodules was slurried in deionized water (900 mL) to form a 25% solid-containing slurry. The pH of the slurry was lowered in steps by addition of 10% HCl solution in water. The pH/acid targets were 4, 3, 2, 1 and 30 g/L HCl. At each pH/acid setpoint, after 30 minutes holding at constant pH/acid level, about 50 mL of slurry was removed from the mixture and filtered. The solids were returned to the reactor and the solution sample was submitted for chemical analysis. The temperature was 25° C. to start and increased to 41° C. due to the heat of reaction of the acid and the seabed nodules.

Results of this test are summarized in Table 1 below. The initial seabed nodules contained 1.06% Cu, 1.2% Ni, 0.14% Co, 0.049% Mo, 6.3% Fe, 28.4% Mn, 2.62% Al, 1.76% Mg and 1.57% Ca. As the pH was decreased from 4 to 3 to 2 to 1 to 30 g/L HCl, magnesium extraction into solution increased to 2570 mg/L (2.57 g/L). The final residue contained 0.781% Mg, and the calculated extraction (distribution to solution) was 60%. Similarly, calcium removal from the nodules reached 82.1%. As the pH was decreased, the amount of other metals in solution increased. In particular, at pH 2 and lower, the concentrations of copper, nickel, cobalt increased. Accordingly, these tests show that it is unexpectedly preferable to use an HCl solution with a pH 2 or above. At the 30 g/L HCl concentration (lowest pH tested), 54% of the copper was extracted along with significant amounts of nickel, cobalt, and other elements.

TABLE 1

Metal Extraction as a Function of HCl Addition.

| pH | Quantity (mL or g) | Cu | Ni | Co | Mo | Fe | Mn | Al | Mg | Ca |
|---|---|---|---|---|---|---|---|---|---|---|
|  |  |  |  |  | Assay (mg/L, %, g/t) |  |  |  |  |  |
|  | Nodules: 300 | 1.06 | 1.20 | 0.14 | 0.049 | 6.30 | 28.4 | 2.62 | 1.76 | 1.57 |
|  | Lixiviant: 900 |  |  |  |  |  |  |  |  |  |
| 4.21 | 41 | 0.7 | 1.6 | <0.7 | <2.0 | <0.4 | 2 | 2 | 1010 | 1220 |
| 3.11 | 41 | 10.1 | 14.5 | <0.7 | <2.0 | 0.6 | 11 | 49 | 1620 | 2160 |
| 2.05 | 44 | 120 | 59.5 | <0.7 | <2.0 | 2.4 | 68 | 377 | 1950 | 2650 |
| 0.99 | 44 | 845 | 181 | <0.7 | <2.0 | 346.0 | 351 | 829 | 2160 | 2800 |
| 0.56 | 932 | 1560 | 577 | <0.7 | <2.0 | 2020 | 578 | 1390 | 2570 | 2940 |
|  | 260.90 | 0.558 | 1.21 | 0.143 | 0.049 | 5.09 | 32.5 | 1.73 | 0.781 | 0.296 |
|  | Distribution (liquor) | 54.2 | 16.7 | 0.4 | 3.0 | 14.2 | 0.8 | 25.6 | 60.0 | 82.1 |
|  | Distribution (residue) | 45.8 | 83.3 | 99.6 | 97.0 | 85.8 | 99.2 | 74.4 | 40.0 | 17.9 |

Example 2. HCl Extraction of Mg from Polymetallic Nodules at pH 3

A second example of the magnesium extraction process was performed in a similar manner to that described in Example 1 above. However, the pH for this test was maintained at a target of 3.0 in order to minimize and control the co-extraction of valuable metals. The Mg distribution in the solution was 35.2% with 0-0.4% of the Cu, Ni, Co, Mo, Fe, Mn extracted. This example illustrates the selectivity of the weakly acidic extraction process. Results of this test are summarized in Table 2 below.

TABLE 2

Seabed Nodule Leaching at pH 3.

| | Min | Quantity (mL or g) | Cu | Ni | Co | Mo | Fe | Mn | Mg |
|---|---|---|---|---|---|---|---|---|---|
|  |  |  |  |  | Assay (mg/L, % or g/t) |  |  |  |  |
| Nodules |  | 300 | 1.06 | 1.20 | 0.1400 | 0.049 | 6.30 | 28.4 | 1.76 |
| Lixiviant |  | 900 |  |  |  |  |  |  |  |
| 30 min | 30 | 38 | 5.8 | 10.5 | <0.3 | <2.0 | 0.4 | 6 | 1530 |
| 60 min | 60 | 38 | 6.4 | 12.5 | <0.3 | <2.0 | 1.5 | 11 | 1760 |
| 90 min | 90 | 37 | 7.7 | 14.6 | <0.3 | <2.0 | 4.2 | 27 | 1820 |
| Final PLS | 120 | 723 | 7.6 | 14.9 | <0.3 | <2.0 | <0.4 | 5 | 1860 |
| Final Residue |  | 285 | 1.25 | 1.36 | 0.126 | 0.0736 | 5.35 | 33.7 | 1.18 |
| Distribution (liquor) |  |  | 0.2 | 0.4 | 0.2 | 2.0 | 0.0 | 0.0 | 35.2 |
| Distribution (residue) |  |  | 99.8 | 99.6 | 99.8 | 98.0 | 100.0 | 100.0 | 64.8 |

Example 3. HCl Extraction of Mg from Polymetallic Nodules at pH 2.5

A third example of the magnesium extraction process was performed in a similar manner to that described in Example 2 above. However, the pH for this test was maintained at a target of 2.5 in order to minimize and control the co-extraction of valuable metals. As the pH was reduced from 3.0 to 2.5, greater extraction of Mg was observed. The Mg distribution in the solution was 35.2% with 0-1.1% of the Cu, Ni, Co, Mo, Fe, Mn extracted. Results of this test are summarized in Table 3 below.

TABLE 3

Seabed Nodule Leaching at pH 2.5.

|  | min | Quantity (mL or g) | Cu | Ni | Co | Mo | Fe | Mn | Al | Mg | Ca |
|---|---|---|---|---|---|---|---|---|---|---|---|
|  |  |  |  |  |  | Assay (mg/L, %, g/t) |  |  |  |  |  |
| Nodules |  | 300 | 1.06 | 1.2 | 0.14 | 0.049 | 6.3 | 28.4 | 2.62 | 1.76 | 1.57 |
| Lixiviant |  | 900 |  |  |  |  |  |  |  |  |  |
| 30 min | 30 | 43 | 26 | 24.8 | <0.3 | <0.6 | <0.3 | 17 | 175 | 1700 | 2640 |
| 60 min | 60 | 43 | 27.8 | 32.7 | <0.3 | <0.6 | <0.3 | 17 | 222 | 1890 | 2780 |
| 90 min | 90 | 43 | 35.4 | 37.9 | <0.3 | <0.6 | <0.3 | 21 | 271 | 1970 | 2860 |
| Final PLS | 120 | 726 | 35.3 | 43.2 | <0.3 | <0.6 | <0.3 | 20 | 295 | 2050 | 2850 |
| Final Residue |  | 295 | 1.08 | 1.21 | 0.115 | 0.0276 | 5.26 | 27.9 | 1.95 | 0.964 | 0.573 |
| Distr. (liquor) |  |  | 1.0 | 1.1 | 0.1 | 0.5 | 0 | 0 | 4.7 | 41.7 | 62.2 |
| Distr. (residue) |  |  | 99.0 | 98.9 | 99.9 | 99.5 | 100 | 100 | 95.3 | 58.3 | 37.8 |

While the disclosed subject matter is described herein in terms of certain embodiments, those skilled in the art will recognize that various modifications and improvements can be made to the disclosed subject matter without departing from the scope thereof. Additional features known in the art likewise can be incorporated. Moreover, although individual features of one embodiment of the disclosed subject matter can be discussed herein or shown in the drawings of the one embodiment and not in other embodiments, it should be apparent that individual features of one embodiment can be combined with one or more features of another embodiment or features from a plurality of embodiments.

In addition to the various embodiments depicted and claimed, the disclosed subject matter is also directed to other embodiments having any other possible combination of the features disclosed and claimed herein. As such, the particular features presented herein can be combined with each other in other manners within the scope of the disclosed subject matter such that the disclosed subject matter includes any suitable combination of the features disclosed herein. The foregoing description of specific embodiments of the disclosed subject matter has been presented for purposes of illustration and description. It is not intended to be exhaustive or to limit the disclosed subject matter to those embodiments disclosed.

It will be apparent to those skilled in the art that various modifications and variations can be made in the method and system of the disclosed subject matter without departing from the spirit or scope of the disclosed subject matter. Thus, it is intended that the disclosed subject matter include modifications and variations that are within the scope of the appended claims and their equivalents.

What is claimed is:

1. A process for metal recovery, the process comprising:
   contacting one or more polymetallic nodules to an acidic solution, thereby selectively extracting one or more magnesium-containing components from the one or more polymetallic nodules;
   after contacting the one or more polymetallic nodules to the acidic solution, separating the extracted one or more magnesium-containing components from the one or more polymetallic nodules; and
   after separating the extracted one or more magnesium-containing components from the one or more polymetallic nodules, providing the one or more polymetallic nodules to a process configured to recover nickel, cobalt, copper, and manganese from the one or more polymetallic nodules.

2. The process of claim 1, wherein providing the one or more polymetallic nodules to the process to recover manganese comprises:
   performing a reductive leaching process on the polymetallic nodules after separating the extracted one or more magnesium-containing components from the one or more polymetallic nodules;
   obtaining a manganese-containing product from an output of the reductive leaching process;
   performing an acid extraction on the manganese-containing product;
   purifying the acid-extracted manganese-containing product; and
   extracting manganese from the purified manganese-containing product.

3. The process of claim 2, wherein the manganese-containing product is manganese carbonate.

4. The process of claim 1, wherein the acidic solution comprises a weak acid configured to selectively remove the one or more magnesium-containing components from the one or more polymetallic nodules.

5. The process of claim 1, wherein the acidic solution comprises hydrochloric acid.

6. The process of claim 1, wherein a pH of the of the acidic solution is greater than or equal to 2.

7. The process of claim 1, further comprising grinding the one or more polymetallic nodules to prepare particles of the one or more polymetallic nodules;
   wherein contacting the one or more polymetallic nodules to the acidic solution comprises contacting the acidic solution to the one or more polymetallic nodules before the one or more polymetallic nodules are ground.

8. The process of claim 1, further comprising grinding the one or more polymetallic nodules to prepare particles of the one or more polymetallic nodules;
   wherein contacting the one or more polymetallic nodules to the acidic solution comprises contacting the acidic solution to the one or more polymetallic nodules while the one or more polymetallic nodules are ground.

\* \* \* \* \*